United States Patent
Song et al.

(10) Patent No.: US 11,931,705 B2
(45) Date of Patent: Mar. 19, 2024

(54) SYSTEM AND METHOD FOR MANUFACTURING DISPERSION LIQUID OF CARBON NANOTUBE

(71) Applicants: Hyundai Motor Company, Seoul (KR); Kia Motors Corporation, Seoul (KR)

(72) Inventors: Hannah Song, Gyeonggi-do (KR); Daehyeon Joung, Gyeonggi-do (KR); Sung Hoon Jeong, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 855 days.

(21) Appl. No.: 16/944,814

(22) Filed: Jul. 31, 2020

(65) Prior Publication Data

US 2021/0275977 A1    Sep. 9, 2021

(30) Foreign Application Priority Data

Mar. 4, 2020    (KR) .................. 10-2020-0026913

(51) Int. Cl.
*B32B 9/00* (2006.01)
*B01F 23/50* (2022.01)
*B01F 23/53* (2022.01)
*B01F 27/27* (2022.01)
*B01F 27/80* (2022.01)
*B01F 33/82* (2022.01)
(Continued)

(52) U.S. Cl.
CPC .............. *B01F 23/53* (2022.01); *B01F 23/51* (2022.01); *B01F 27/27* (2022.01); *B01F 27/80* (2022.01); *B01F 33/821* (2022.01); *B01F 35/714* (2022.01); *C01B 32/174* (2017.08); *B01F 23/56* (2022.01); *B82Y 30/00* (2013.01); *B82Y 40/00* (2013.01); *Y10T 428/30* (2015.01)

(58) Field of Classification Search
CPC ... Y10T 428/30; C01B 32/159; C01B 32/174; Y10S 977/742; B82Y 30/00; B82Y 40/00; B01F 27/80
USPC .......................................................... 428/40
See application file for complete search history.

(56) References Cited

U.S. PATENT DOCUMENTS

2021/0062086 A1*   3/2021   Sun ....................... C03C 14/006

FOREIGN PATENT DOCUMENTS

| JP | 2017-043520 A | 3/2017 |
|---|---|---|
| KR | 10-2010-0046320 A | 5/2010 |
| KR | 10-1666265 B1 | 10/2016 |

\* cited by examiner

*Primary Examiner* — Daniel H Miller
(74) *Attorney, Agent, or Firm* — Fox Rothschild LLP

(57) ABSTRACT

Provided are a system for manufacturing dispersion liquid of carbon nanotubes and a method of manufacturing a dispersion liquid of carbon nanotubes using the same. The system includes; a mixing device supplied with solvent and carbon nanotubes, and storing a admixture of the solvent and the carbon nanotubes; a first dispersion device connected to the mixing device, performing a primary dispersion of the carbon nanotubes by an operation of a rotor and a stator, and then performing a secondary dispersion to form bent portions in the carbon nanotubes while discharging the carbon nanotubes through penetration holes of the stator; and a second dispersion device performing a tertiary dispersion of the carbon nanotubes to selectively cut the bent portions of the carbon nanotubes by irradiating a laser when the secondarily dispersed admixture recirculates to the mixing device.

15 Claims, 4 Drawing Sheets

(51) Int. Cl.
*B01F 35/71* (2022.01)
*C01B 32/174* (2017.01)
*B82Y 30/00* (2011.01)
*B82Y 40/00* (2011.01)

SYSTEM AND METHOD FOR MANUFACTURING DISPERSION LIQUID OF CARBON NANOTUBE

CROSS-REFERENCE TO RELATED APPLICATION

This application claims priority to and the benefit of Korean Patent Application No. 10-2020-0026913 filed in the Korean Intellectual Property Office on Mar. 4, 2020, the entire contents of which are incorporated herein by reference.

TECHNICAL FIELD

The present invention relates to a system and method for manufacturing a dispersion liquid of carbon nanotube.

BACKGROUND

Generally, a carbon nanotube (CNT) is a material in which carbon atoms are combined with one another in a hexagonal honeycomb pattern to form a tube. The diameter of a carbon nanotube ranges from 1 nm to 100 nm, length reaches hundreds of micrometers, and such a carbon nanotube shows very large anisotropy.

Such carbon nanotubes may include single-walled carbon nanotubes, double-walled carbon nanotubes, multi-walled carbon nanotubes, rope carbon nanotubes. The carbon nanotubes have a high electric conductivity comparable to metal by overlapping $\pi$ electrons present on the outer wall.

Multifunctional nanocomposite materials have been developed using the excellent mechanical properties and electric conductivity of the carbon nanotube.

For example, the nanocomposite material may be a composite material to which conductivity is given by adding carbon nanotube to a non-conductive material, or a composite material to which carbon nanotube is added as a reinforcing material of a polymer resin.

However, since the carbon nanotubes are obtained in an aggregated state by the Van der Waals force in the synthesis process, it may be difficult to uniformly disperse the carbon nanotubes in a liquid or slurry.

As described above, the carbon nanotube existing in the aggregated state generates a phenomenon of increasing viscosity in a liquid or slurry, thereby being difficult to be handled. In addition, it is difficult to secure an efficient electron conduction path, and utilization of dispersion liquid may be deteriorated in subsequent processes.

Therefore, a process of dispersing the carbon nanotubes into individual nanotubes is an important process in the development of composite materials with excellent properties.

Meanwhile, the carbon nanotube may be manufactured through an arc discharge method, a laser evaporation method, a chemical vapor deposition method, or the like.

Among the above-mentioned manufacturing methods, a chemical vapor deposition method typically can produce carbon nanotubes by dispersing and reacting metal catalyst particles and a hydrocarbon-based raw material gas in a high temperature fluidized bed reactor.

For example, the metal catalyst is suspended in a bed reactor fluidized by raw material gas and reacts with the raw material gas to grow carbon nanotubes. In the synthesis process of the carbon nanotube, aggregation may occur between carbon nanotube particles. The physical aggregation is that the nanotube particles are intertwined at a micro level, and the chemical aggregate is that the nanotube particles are aggregated by the surface attraction such as the intermolecular Van der Walls force at the nanometer level.

As such, the dispersion process of the carbon nanotube can be very important because such a carbon nanotube aggregation phenomenon may interfere with the formation of a three-dimensional network structure that may improve the mechanical strength and conductivity characteristics.

Therefore, in order to fully exhibit the physical and chemical characteristics of the carbon nanotube, it would be highly beneficial to minimize the length of the carbon nanotube and to develop a dispersion method that does not deteriorate physical properties of the nanotubes.

The above information disclosed in this Background section is only for enhancement of understanding of the background of the invention, and therefore it may contain information that does not form the prior art that is already known in this country to a person of ordinary skill in the art.

SUMMARY

In preferred aspects, provided are a system and a method for manufacturing dispersion liquid of carbon nanotube having advantages of preventing a damage to the carbon nanotubes due to mechanical force while increasing dispersed characteristic.

In an aspect, provided is a system for manufacturing a dispersion liquid of carbon nanotubes. The system may include a mixing device, a first dispersion device, and a second dispersion device. The mixing device may be supplied with a solvent and carbon nanotubes (e.g., in a powder form), and stores an admixture of the solvent and the carbon nanotubes. The first dispersion device may be connected to the mixing device, perform a primary dispersion of the carbon nanotubes by an operation of a rotor and a stator, and then perform a secondary dispersion to form bent portions in the carbon nanotubes while discharging the carbon nanotubes through penetration holes of the stator. The second dispersion device may perform a tertiary dispersion of the carbon nanotubes to selectively cut the bent portions of the carbon nanotubes by irradiating a laser when the secondarily dispersed admixture recirculates to the mixing device.

The mixing device may include a solvent tank storing the solvent, a carbon nanotube tank storing the carbon nanotubes, and a mixer tank connected to the solvent tank and the carbon nanotube tank and configured to mix the solvent and the carbon nanotubes supplied from the solvent tank and the carbon nanotube tank.

The carbon nanotube tank may supply the carbon nanotubes to the mixer tank through an automatic feeder by a predetermined amount.

The first dispersion device may include a storage tank connected to the mixing device and supplied with the admixture from the mixing device. The rotor may include a rotation shaft disposed along an inflow direction of the admixture, and may be disposed in an inner center of the storage tank to rotate in a direction perpendicular to the inflow direction of the admixture. The stator may include an open side facing the inflow direction of the admixture, a closed side fixed to the storage tank, and a plurality of penetration holes formed on a circumference surface surrounding the rotor.

A diameter of the penetration hole of the stator may be set in a range of about 20 mm to 200 mm.

A gap between the rotor and the stator may be set in a range of about 10 mm to 500 mm.

The second dispersion device may include a laser beam device facing a connection pipe through which the admixture flows from first dispersion device to the mixing device.

The connection pipe may be formed of an optical glass.

An energy of the laser irradiated by the laser beam device may be set in a range of about 250 mJ/cm$^2$ to 600 mJ/cm$^2$.

An exemplary method for manufacturing dispersion liquid of carbon nanotubes, the method includes forming admixture including a solvent and carbon nanotubes by a mixing device, performing a primary dispersion of the carbon nanotubes by rotation of a rotor in a first dispersion device after receiving the admixture from the mixing device, performing a secondary dispersion of the carbon nanotubes by discharging the primarily dispersed carbon nanotubes through penetration holes of a stator surrounding the rotor by the rotation of the rotor, and performing a tertiary dispersion to the secondary dispersed carbon nanotubes by a second dispersion device using laser.

The carbon nanotubes may be in a powder form.

The forming of the admixture may include supplying the solvent stored in a solvent tank to a mixer tank by an operation of a motor, supplying the carbon nanotubes stored in a carbon nanotubes tank to the mixer tank, and forming the admixture by mixing the solvent and the carbon nanotubes by a stiffer installed in the mixer tank.

The performing of the primary dispersion may include i) moving the admixture from the mixing device to a storage tank of the first dispersion device by the rotation of the rotor of the first dispersion device, and ii) primarily dispersing the carbon nanotubes by debundling the carbon nanotubes between the rotor and the stator as the rotor rotates.

In the performing of the secondary dispersion, bent portions may be formed in the carbon nanotubes.

In the performing of the tertiary dispersion, the bent portions of the carbon nanotubes may be selectively cut by irradiating the laser when the secondarily dispersed admixture recirculates to the mixing device.

In the performing of the tertiary dispersion, the energy of the laser may be set in a range of about 250 mJ/cm$^2$ to 600 mJ/cm$^2$.

According to various exemplary embodiments of the system and the method for manufacturing a dispersion liquid of carbon nanotube, the carbon nanotubes may be dispersed without causing damage by a mechanical force For example, the carbon nanotubes can be de-bundled by a shear force between the rotor and the stator, bent to form the bent portions by the centrifugal force, and only the bent portions are selectively cut by irradiating the laser having an energy corresponding to the double bond energy between carbons of the carbon nanotubes. Therefore, physical damage to the carbon nanotubes may be minimized.

Other effects that may be obtained or are predicted by an exemplary embodiment will be explicitly or implicitly described in a detailed description of the present invention. That is, various effects that are predicted according to an exemplary embodiment will be described in the following detailed description.

Other aspects of the inventions are disclosed infra.

DETAILED DESCRIPTION

Figure 1:
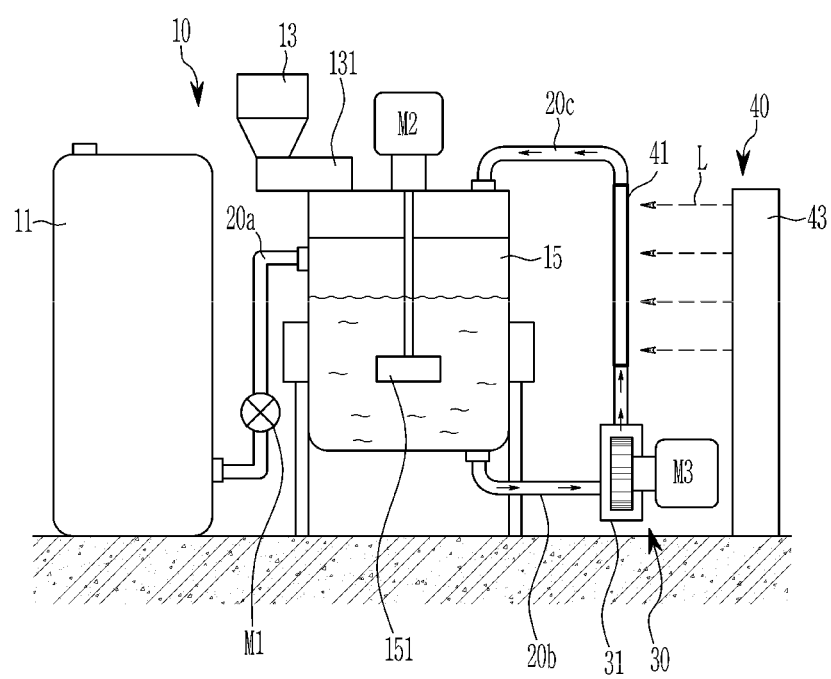
FIG. 1 shows an exemplary system for manufacturing an exemplary dispersion liquid of carbon nanotube according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clarify the present invention, parts that are not connected to the description will be omitted, and the same elements or equivalents are referred to with the same reference numerals throughout the specification.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

In the following description, dividing names of components into first, second, and the like is to divide the names because the names of the components are the same as each other, and an order thereof is not particularly limited.

Provided are, inter alia, a system and a method for manufacturing to manufacture a dispersion liquid of carbon nanotubes, which may be used as for a conductive material of a battery.

The term "dispersion" used hereinafter is used as a general term for "a phenomenon in which the carbon nanotube aggregate is physically cut or chemically processed to reduce the volume and/or length of the aggregate or the entanglement of the carbon nanotube aggregate is separated and dispersed".

FIG. 1 shows an exemplary system for manufacturing an exemplary dispersion liquid of carbon nanotube according to an exemplary embodiment of the present invention.

As shown in FIG. 1, an exemplary system for manufacturing an exemplary dispersion liquid of carbon nanotube includes: a mixing device 10, a first dispersion device 30, and a second dispersion device 40.

The mixing device 10 includes a solvent tank 11 for storing solvent in a liquid state, The solvent may suitably include N-Methyl-2-pyrrolidone (NMP) or aqueous solution.

Figure 3:
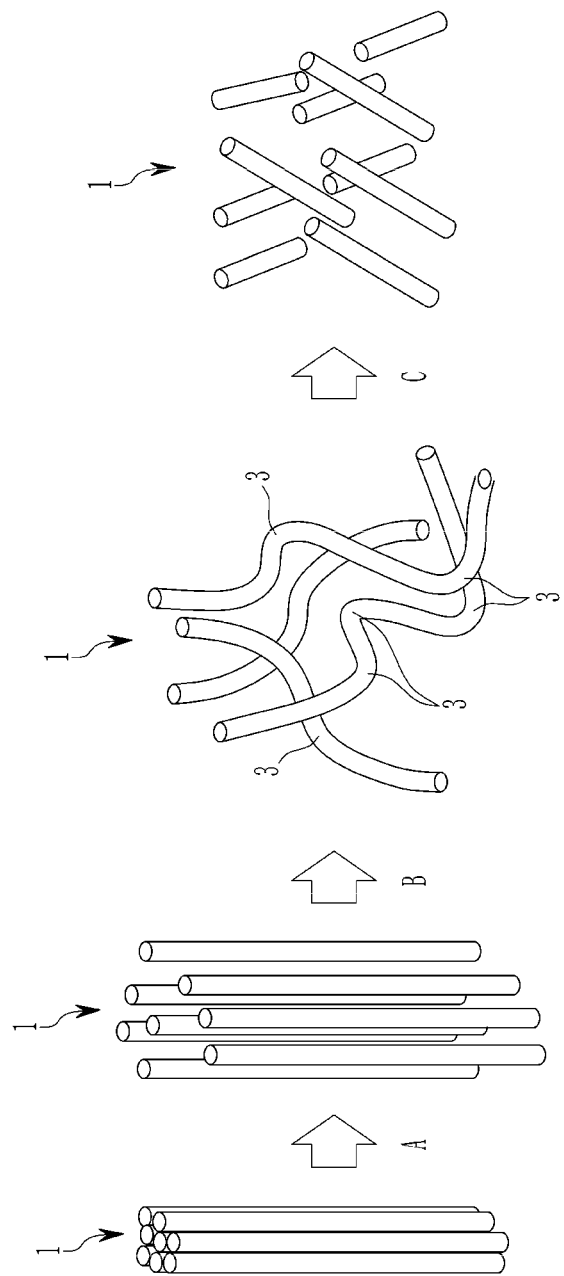
FIG. 3 illustrates states of carbon nanotube dispersed according to exemplary system and method for manufacturing dispersion liquid of carbon nanotube according to an exemplary embodiment in the present invention.

In addition, the mixing device 10 includes a carbon nanotube tank 13 storing carbon nanotubes 1 (as shown in FIG. 3) in a powder form.

The carbon nanotubes 1 plays an important role in improving durability of a battery due to its high electrical conductivity and mechanical strength.

Therefore, it would be beneficial that the carbon nanotubes 1 is prevented from being damaged during dispersion such that the electrical conductivity is not lowered.

In addition, the solvent tank 11 and the carbon nanotube tank 13 are respectively connected to a mixer tank 15.

For example, the solvent tank 11 and the mixer tank 15 are connected to each other through a fluid pipe 20a, and a hydraulic M1 is configured in the fluid pipe 20a.

The solvent may be transferred to the mixer tank 15 by driving the motor M1.

In addition, the carbon nanotube tank 13 may be disposed above the mixer tank 15, and the carbon nanotube tank 13 may supply the carbon nanotubes to the mixer tank 15 through an automatic feeder 131 by a predetermined amount.

The automatic feeder 131 may be applied with a general or known technique of automatically supplying a predetermined amount of an object.

When the solvent and the carbon nanotubes 1 are supplied to the mixer tank 15 in a predetermined amount, the mixture is continuously mixed by a stirrer 151 configured in the mixer tank 15.

The stirrer 151 simply rotates by the operation of a motor M2 to make the admixture by simply mixing the solvent and the carbon nanotubes 1.

Figure 2:
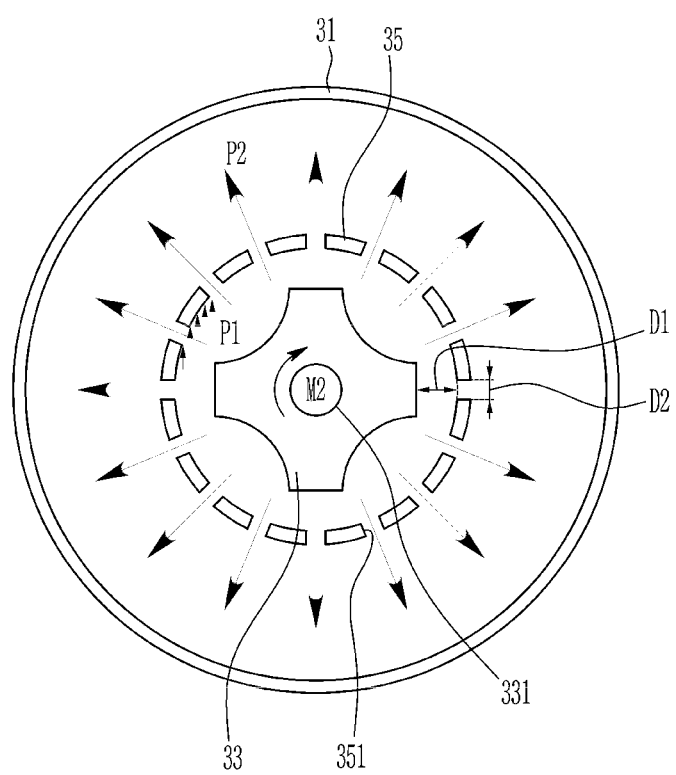
FIG. 2 shows an exemplary first dispersion device applied to an exemplary system for manufacturing an exemplary dispersion liquid of carbon nanotube according to an exemplary embodiment of the present invention.

FIG. 2 shows an exemplary first dispersion device applied to an exemplary system for manufacturing an exemplary dispersion liquid of carbon nanotube according to an exemplary embodiment of the present invention. FIG. 3 illustrates states of carbon nanotube dispersed according to an exemplary system and an exemplary method for manufacturing an exemplary dispersion liquid of carbon nanotube according to an exemplary embodiment of the present invention.

As shown in FIG. 2 and FIG. 3, the first dispersion device 30 includes a storage tank 31 connected to the mixer tank 15 through a fluid pipe 20b.

At this time, the storage tank 31 may be connected to a bottom of the mixer tank 15 through the fluid pipe 20b.

A rotor 33 is installed in an inner center of the storage tank 31.

A rotation shaft 331 of the rotor 33 is disposed along a same direction with an inflow direction of the admixture, and the rotor 33 rotates in a direction perpendicular to the inflow direction of the admixture.

The rotation shaft 331 of the rotor 33 may be rotated by being connected to a drive motor M3 outside the storage tank 31.

As the rotor 33 rotates, the admixture in the mixer tank 15 flows into the storage tank 31.

In addition, a stator 35 surrounding the rotor 33 is installed inside the storage tank 31.

The stator 35 disposed in the storage tank 31 is open at a side facing the inflow direction of the admixture, and a closed side of the stator is fixed to the storage tank 31, together with the drive motor M3 of the rotor 33.

For example, through the open side of the stator 35, the admixture flows into a space between the rotor 33 and the stator 35.

As the rotor 33 rotates, the carbon nanotubes 1 are primarily dispersed through debundling, in which the bundle is released by a shear force P1 generated between the rotor 33 and the stator 35 (see the arrow A in FIG. 3).

The debundling means that the carbon nanotubes 1 that has been agglomerated are separated into each strand.

At this time, a gap D1 between the rotor 33 and the stator 35 may be set in a range of 10 mm to 500 mm.

This is a predetermined value to minimize the wear of the rotor 33 and the stator 35 while dispersing by applying a shear force to the carbon nanotubes 1.

In addition, a plurality of penetration holes 351 are formed on a circumference surface of the stator 35.

The admixture that has been primarily dispersed between the rotor 33 and the stator 35 exits out of the stator 35 through the penetration holes 351 of the stator 35 by a centrifugal force P2 of the rotor 33 that is continuously rotating.

The penetration hole 351 may be formed in a circular or polygonal shape.

For example, while the carbon nanotubes 1 pass through the penetration hole 351, the carbon nanotubes 1 are secondarily dispersed through bending, in which a bent portion 3 is formed in the carbon nanotube 1 (Bending, refer to the arrow B in FIG. 3).

The strain of the bent portion 3 is at maximum in the carbon nanotube 1.

For example, the bent portion 3 on the carbon nanotubes 1 may be easily deformed with little force.

Regardless of whether the penetration holes 351 is in a circular or polygonal shape, a size D2 of the penetration holes may be set in a range of about 20 mm to 200 mm.

The size D2 may be set in consideration of the size of the carbon nanotubes 1.

Meanwhile, the admixture having passed through the first dispersion device 30 is recirculated to the mixer tank 15.

For example, the second dispersion device 40 is configured between the mixer tank 15 and the first dispersion device 30.

The second dispersion device 40 includes a laser beam device 43 facing a connection pipe 41 through which the admixture flows from the first dispersion device 30 to the mixer tank 15.

The connection pipe 41 is formed in a region of a fluid pipe 20c through which the admixture circulates from the storage tank 31 to the mixer tank 15.

The connection pipe 41 may be integrally formed with the fluid pipe 20c, and may be separately manufactured and assemble with the fluid pipe 20c.

For example, the connection pipe 41 may suitably include, or be formed of an optical glass.

The connection pipe 41 made of an optical glass material may easily absorb laser L irradiated from the laser beam device 43.

The carbon nanotubes 1 are performed with tertiary dispersion through cutting, in which the bent portions 3 of the carbon nanotubes 1 are selectively cut by the second dispersion device 40 (see the arrow C in FIG. 3).

For example, the energy of the laser irradiated by the laser beam device 43 may be set in a range of about 250 mJ/cm$^2$ to 600 mJ/cm$^2$.

Such energy of the laser may be set to be greater than the strain of the bent portions 3 of the carbon nanotubes 1, and to be a predetermined value that does not cause deformation in remaining part of the carbon nanotubes 1.

A method for manufacturing dispersion liquid of carbon nanotube utilizes such a system for manufacturing dispersion liquid of carbon nanotube.

Figure 4:
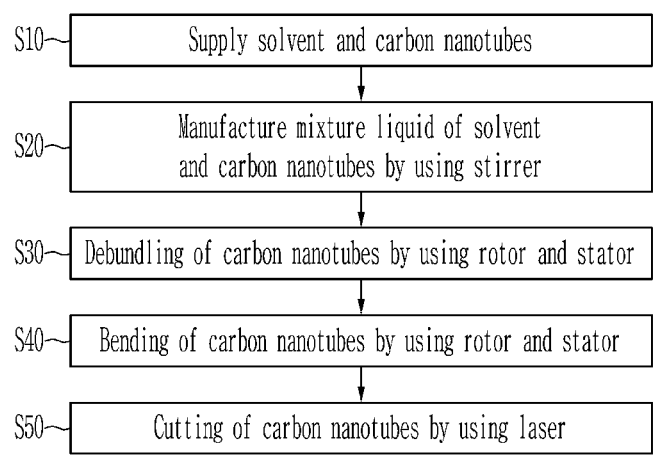
FIG. 4 is a flowchart showing a shows an exemplary method for manufacturing an exemplary dispersion liquid of carbon nanotube according to an exemplary embodiment of the preset invention.

FIG. 4 shows an exemplary method for manufacturing an exemplary dispersion liquid of carbon nanotube according to an exemplary embodiment of the present invention.

As shown in FIG. 4, firstly at step S10, a predetermined amount of solvent is supplied from the solvent tank 11 to the mixer tank 15, and a predetermined amount of the carbon nanotubes 1 are supplied from the carbon nanotube tank 13 to the mixer tank 15.

At step S20, the solvent and the carbon nanotubes 1 are mixed in the mixer tank 15 by the stirrer 151 to form the admixture of a predetermined ratio.

The admixture circulates from the mixing device 10, through the first dispersion device 30 and the second dispersion device 40, and then back to the mixing device 10, thereby performing dispersion of the admixture. The circulation process and the mixing process S10 performed together with the circulation process may be performed differently depending on concentration of the carbon nanotubes 1 in the admixture.

For example, the carbon nanotubes 1 and the solvent may be mixed to form the admixture of 0.1 wt % of the carbon nanotubes. The circulation process in which the carbon nanotubes 1 in the admixture are dispersed may be repeated for 1 hour at minimum to 5 hours at maximum.

In another example, the carbon nanotubes 1 and the solvent may be mixed to form the admixture of 3 wt % of the carbon nanotubes. The circulation process in which the carbon nanotubes 1 in the admixture are dispersed may be repeated for 5 hours at minimum to 24 hours at maximum.

Subsequently, the admixture is automatically supplied to the first dispersion device 30.

For example, by the rotation of the rotor 33 of the first dispersion device 30, the admixture mixed in the mixing device 10 is inhaled to the first dispersion device 30.

At this time, at step S30, as the rotor 33 rotates, the carbon nanotubes 1 are de-bundled between the rotor 33 and the stator 35, which is called the primary dispersion (see the arrow A in FIG. 3).

Then, by the rotation of the rotor 33, the primarily dispersed carbon nanotubes 1 is discharged through the penetration hole 351 of the stator 35 to an exterior of the stator 35.

For example, at step S40, the carbon nanotubes 1 is performed with the secondary dispersion while passing through the penetration hole 351, by which the carbon nanotubes 1 are bent to form the bent portions 3 (see the arrow B in FIG. 3).

The strain of the bent portion 3 is at maximum in the carbon nanotube 1.

For example, the bonding strength between carbons of the carbon nanotubes 1 becomes minimum at the bent portions 3.

Subsequently, the secondarily dispersed carbon nanotubes 1 move toward the second dispersion device 40 by the rotation of the rotor 33.

For example, at step S50, the carbon nanotubes 1 is performed with the tertiary dispersion, by which the bent portions 3 of the carbon nanotubes 1 are cut by the energy of the laser irradiated by the laser beam device 43 (see the arrow C in FIG. 3).

Only the bent portions 3 in the carbon nanotubes 1 are selectively cut by the laser beam device 43.

For example, the laser may cut the Van der Walls force between carbons in the carbon nanotubes 1.

The above described primary dispersion, secondary dispersion, and tertiary dispersion may be continuously repeated for a required period of time.

Therefore, according to various exemplary systems and methods for manufacturing the dispersion liquid of carbon nanotube, the carbon nanotubes 1 may be dispersed without causing damage by a mechanical force.

For example, according to various exemplary systems and methods for manufacturing the dispersion liquid of carbon nanotube, the carbon nanotubes 1 are de-bundled by a shear force P1 between the rotor 33 and the stator 35, bent to form the bent portions 3 by the centrifugal force P2, and only the bent portions 3 are selectively cut by irradiating the laser having an energy corresponding to the double bond energy (C═C) between carbons of the carbon nanotubes 1. Therefore, physical damage to the carbon nanotubes 1 may be minimized.

In addition, according to system and method for manufacturing dispersion liquid of carbon nanotube according to various exemplary embodiments of the present invention, debundling, bending, and cutting processes may be simultaneously performed in a single apparatus, thereby reducing process time and cost.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

1: carbon nanotube
3: bent portion
10: mixing device
11: solvent tank
13: carbon nanotube tank
131: automatic feeder
15: mixer tank
151: stirrer 20: fluid pipe
30: first dispersion device
31: storage tank
33: rotor
331: rotation shaft
35: stator
351: penetration hole
40: second dispersion device
41: connection pipe
43: laser beam device

What is claimed is:

1. A system for manufacturing a dispersion liquid of carbon nanotubes, comprising:
   a mixing device configured to form an admixture comprising one or more solvents and carbon nanotubes;
   a first dispersion device comprising:
      a storage tank connected to the mixing device for receipt of an inflow of the admixture therefrom;
      a rotor comprising a rotation shaft disposed in an inner center of the storage tank along an inflow direction of the admixture, and operable to rotate in a direction perpendicular to an inflow direction of the admixture; and
      a stator disposed within the storage tank and adjacent to the rotor, the stator comprising an open side facing the inflow direction of the admixture, a closed side fixed to the storage tank, and a plurality of penetration holes formed on a circumference surface surrounding the rotor;
      wherein the first dispersion device is configured to form perform a primary dispersion of the carbon nanotubes by rotation of the rotor and then a secondary dispersion to form bent portions in the carbon nanotubes while discharging the carbon nanotubes through penetration holes of the stator; and
   a second dispersion device configured to perform a tertiary dispersion of the carbon nanotubes to selectively cut the bent portions of the carbon nanotubes by irradiating a laser when the secondarily dispersed admixture recirculates to the mixing device from the first dispersion device.

2. The system of claim 1, wherein the mixing device comprises:
   a solvent tank storing the solvent;
   a carbon nanotube tank storing the carbon nanotubes; and
   a mixer tank connected to the solvent tank and the carbon nanotube tank and configured to mix the solvent and the carbon nanotubes supplied from the solvent tank and the carbon nanotube tank.

3. The system of claim 2, wherein the carbon nanotube tank supplies the carbon nanotubes to the mixer tank through an automatic feeder by a predetermined amount.

4. The system of claim 1, wherein a diameter of the plurality of penetration holes of the stator is set in a range of about 20 mm to 200 mm.

5. The system of claim 1, wherein a gap between the rotor and the stator is set in a range of about 10 mm to 500 mm.

6. The system of claim 1, wherein the second dispersion device comprises a laser beam device facing a connection pipe through which the admixture flows from the first dispersion device to the mixing device.

7. The system of claim 6, wherein the connection pipe is formed of an optical glass.

8. The system of claim 6, wherein an energy of the laser is set in a range of about 250 $mJ/cm^2$ to 600 $mJ/cm^2$.

9. A method for manufacturing a dispersion liquid of carbon nanotubes, the method comprising:
   forming an admixture comprising a solvent and carbon nanotubes in a mixing device;
   performing a primary dispersion of the carbon nanotubes by rotation of a rotor in a first dispersion device after receiving an inflow of the admixture from the mixing device;
   performing a secondary dispersion of the carbon nanotubes by discharging the primarily dispersed carbon nanotubes through a plurality of penetration holes of a stator surrounding the rotor by the rotation of the rotor; and
   performing a tertiary dispersion to the secondary dispersed carbon nanotubes by a second dispersion device using laser;
   wherein the first dispersion device comprises:
      a storage tank connected to the mixing device for receipt of the inflow of the admixture therefrom;
      the rotor comprising a rotation shaft disposed in an inner center of the storage tank along an inflow direction of the admixture, and operable to rotate in a direction perpendicular to an inflow direction of the admixture; and
      the stator comprising an open side facing the inflow direction of the admixture, a closed side fixed to the storage tank, and the plurality of penetration holes, formed on a circumference surface surrounding the rotor.

10. The method of claim 9, wherein the forming of the admixture comprises:
    supplying the solvent stored in a solvent tank to a mixer tank by an operation of a motor;
    supplying the carbon nanotubes stored in a carbon nanotubes tank to the mixer tank; and
    forming the admixture by mixing the solvent and the carbon nanotubes by a stirrer installed in the mixer tank.

11. The method of claim 9, wherein the performing of the primary dispersion comprises:
    moving the admixture from the mixing device to the storage tank of the first dispersion device by the rotation of the rotor of the first dispersion device; and
    primarily dispersing the carbon nanotubes by debundling the carbon nanotubes between the rotor and the stator as the rotor rotates.

12. The method of claim 11, wherein, in the performing of the secondary dispersion, bent portions are formed in the carbon nanotubes.

13. The method of claim 12, wherein, in the performing of the tertiary dispersion, the bent portions of the carbon nanotubes are selectively cut by irradiating the laser when recirculating the secondarily dispersed admixture to the mixing device.

14. The method of claim 13, wherein, in the performing of the tertiary dispersion, an energy of the laser is set in a range of about 250 $mJ/cm^2$ to 600 $mJ/cm^2$.

15. The method of claim 9, wherein the carbon nanotubes are in a powder form.

* * * * *